United States Patent
Katou

(10) Patent No.: US 12,097,607 B2
(45) Date of Patent: Sep. 24, 2024

(54) ROBOT CONTROLLER

(71) Applicant: FANUC CORPORATION, Yamanashi (JP)

(72) Inventor: Tomoki Katou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 689 days.

(21) Appl. No.: 16/991,264

(22) Filed: Aug. 12, 2020

(65) Prior Publication Data

US 2021/0069911 A1    Mar. 11, 2021

(30) Foreign Application Priority Data

Sep. 9, 2019    (JP) ................................ 2019-163829

(51) Int. Cl.
| | |
|---|---|
| B25J 13/00 | (2006.01) |
| B25J 9/00 | (2006.01) |
| B25J 13/06 | (2006.01) |
| H04L 67/12 | (2022.01) |

(52) U.S. Cl.
CPC ........... B25J 13/006 (2013.01); B25J 9/0084 (2013.01); B25J 13/06 (2013.01); H04L 67/12 (2013.01)

(58) Field of Classification Search
CPC ........ B25J 13/006; B25J 9/0084; B25J 13/06; H04L 67/12; G05B 2219/31165; G05B 2219/33192; G05B 19/042
See application file for complete search history.

(56) References Cited

U.S. PATENT DOCUMENTS

2018/0091216 A1*   3/2018   Takaoki ................. G08C 17/02
2021/0114199 A1*   4/2021   Mhd ........................ B25J 9/163

FOREIGN PATENT DOCUMENTS

| CN | 108888478 A | * | 11/2018 | ........... A61H 1/0274 |
| JP | 3848808 B2 | * | 11/2006 | |
| JP | 2010057037 A | * | 3/2010 | |
| JP | 2014-225764 | | 12/2014 | |
| JP | 2018144129 A | * | 9/2018 | .............. B25J 13/00 |

OTHER PUBLICATIONS

English Translation for JP 3848808 B2 (Year: 2006).*
English Translation for reference JP2018144129 (Year: 2018).*
English Translation for JP2010057037A (Year: 2010).*
English translation for CN108888478 (Year: 2018).*

* cited by examiner

*Primary Examiner* — Rachid Bendidi
(74) *Attorney, Agent, or Firm* — Wenderoth, Lind & Ponack, L.L.P.

(57) ABSTRACT

To provide a robot controller configured to reliably receive data from a robot even when there is a shield. A robot controller receives a signal transmitted by a wireless device mounted to a robot that is a control target. The signal includes data of an operating state of the robot. The robot controller includes: a first receiving unit that receives the signal including the data from the wireless device; a transfer unit that, in a case in which the signal received by the first receiving unit is a signal from other robot not to be controlled, transfers the signal to other robot controller controlling the other robot; a second receiving unit that receives the signal transferred from the other robot controller; and a signal processing unit that processes the signal received by the first receiving unit and/or the signal received by the second receiving unit.

4 Claims, 4 Drawing Sheets

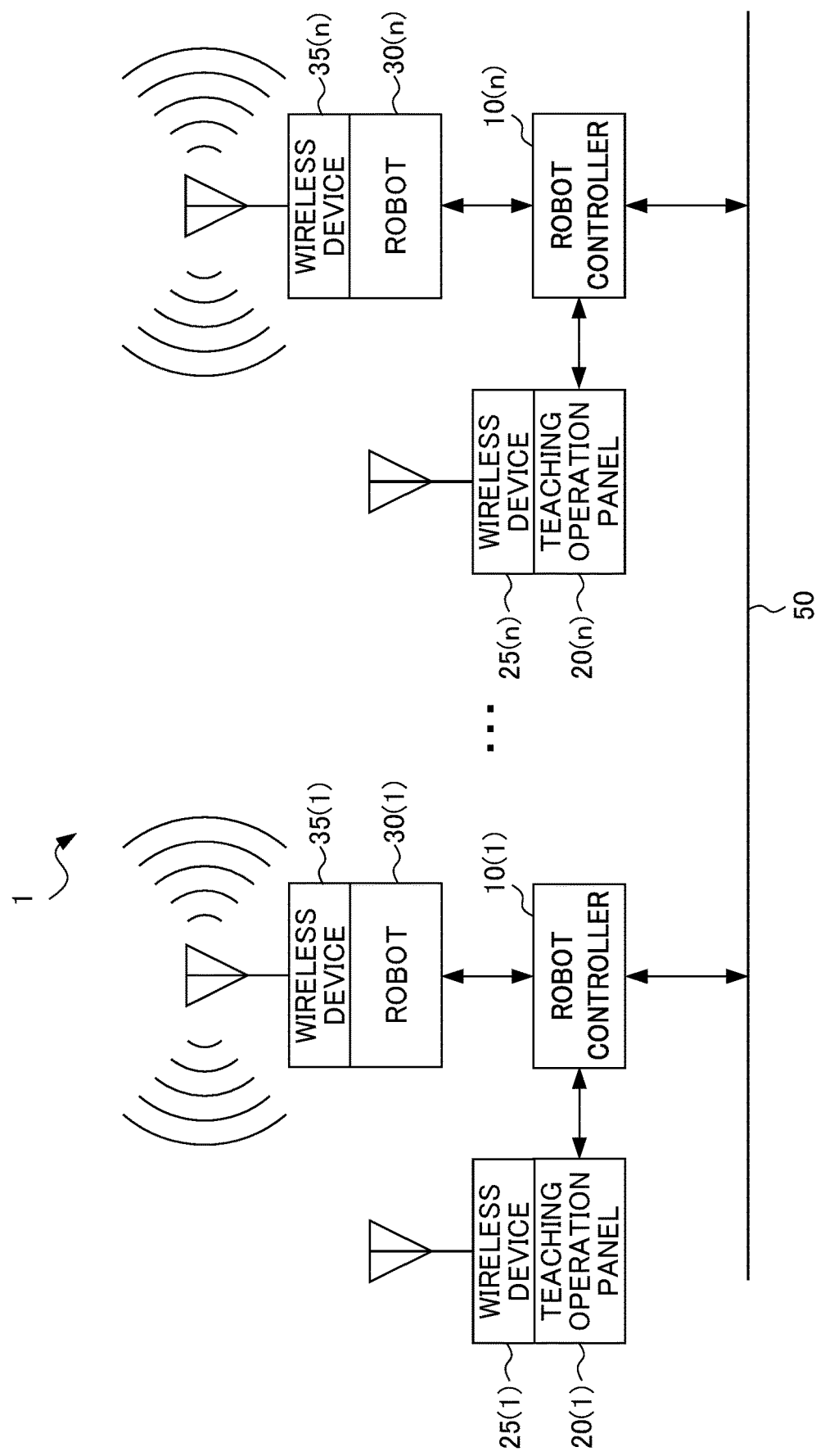

FIG. 2

| DATA ITEM | SIZE | REMARKS |
|---|---|---|
| SEQUENCE NUMBER | 2byte | INCREMENT BY 1 FROM INITIAL VALUE FOR EACH TRANSMISSION |
| TRANSMISSION FLAG | 1bit | TRANSMISSION COMPLETED BY 1 |
| X | 4byte | POSITION DATA (X AXIS COORDINATE) |
| Y | 4byte | POSITION DATA (Y AXIS COORDINATE) |
| Z | 4byte | POSITION DATA (Z AXIS COORDINATE) |
| W | 4byte | POSTURE DATA (ROTATION ANGLE AROUND X AXIS) |
| P | 4byte | POSTURE DATA (ROTATION ANGLE AROUND Y AXIS) |
| R | 4byte | POSTURE DATA (ROTATION ANGLE AROUND Z AXIS) |
| configuration | 1byte | OTHER POSTURE DATA |

ROBOT CONTROLLER

This application is based on and claims the benefit of priority from Japanese Patent Application No. 2019-163829, filed on 9 Sep. 2019, the content of which is incorporated herein by reference.

BACKGROUND OF THE INVENTION

Field of the Invention

The present invention relates to a robot controller.

Related Art

Some robot controllers acquire data of the operating state of a robot to be controlled (e.g., position and posture, etc.), using a wireless signal transmitted by a wireless device disposed in the robot. For example, refer to Patent Document 1.

Patent Document 1: Japanese Unexamined Patent Application, Publication No. 2014-225764

SUMMARY OF THE INVENTION

However, when there is a shield such as a wall or a workpiece between the robot controller and the wireless device of the robot, or when the robot itself becomes a shield of the wireless device due to the posture of the robot, etc., it is difficult for the robot controller to receive the signal of the data of the operating state of the robot. In this case, the robot controller cannot receive the signal of the data of the operating state of the robot for a predetermined time, judges that some abnormality has occurred in the robot, and times out the communication with the robot.

Therefore, it is desired that a robot controller reliably will receive data from a robot even if there is a shield.

An aspect of a robot controller of the present disclosure relates to a robot controller that receives a signal transmitted by a wireless device mounted to a robot that is a control target, the signal including data of an operating state of the robot, the robot controller including: a first receiving unit that receives the signal including the data from the wireless device; a transfer unit that, in a case in which the signal received by the first receiving unit is a signal from other robot not to be controlled, transfers the signal to other robot controller controlling the other robot; a second receiving unit that receives the signal transferred from the other robot controller; and a signal processing unit that processes the signal received by the first receiving unit and/or the signal received by the second receiving unit.

According to one aspect, it is possible for the robot controller to reliably receive data from the robot even if there is a shield.

BRIEF DESCRIPTION OF THE DRAWINGS

FIG. 1 is a block diagram of a robot system 1 according to an embodiment;

FIG. 2 is a diagram showing an example of data of an operating state included in a signal;

DETAILED DESCRIPTION OF THE INVENTION

Figure 3:
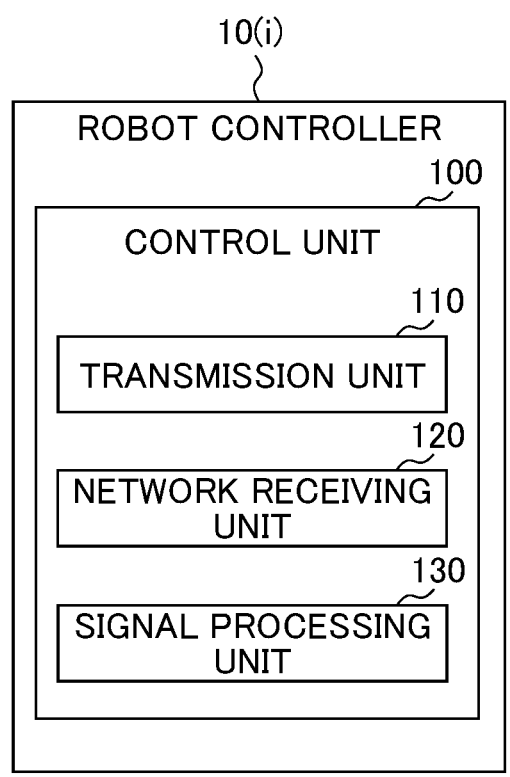
FIG. 3 is a diagram showing functional blocks of a robot controller.

Hereinafter, one embodiment will be described with reference to the drawings.

Embodiment

FIG. 1 is a block diagram of a robot system 1 according to an embodiment. As shown in FIG. 1, the robot system 1 includes, for example, n-number of robot controllers 10(1)-10(n), teaching operation panels 20(1)-20(n), and robots 30(1)-30(n) in the same factory. It should be noted that n is an integer of 2 or more.

Hereinafter, when it is not necessary to individually distinguish between each of the robot controllers 10(1)-10(n), these are collectively referred to as "robot controller 10". When it is not necessary to individually distinguish between each of the teaching operation panels 20(1)-20(n), they are collectively referred to as "teaching operation panel 20". In addition, when it is not necessary to individually distinguish between each of the robots 30(1)-30(n), these are also collectively referred to as "robot 30".

The robot controller 10(i), the teaching operation panel 20(i), and the robot 30(i) are configured as a set (i is an integer from 1 to n). Furthermore, the robot controller 10(i) and the teaching operation panel 20(i), and the robot controller 10(i) and the robot 30(i) may be directly connected to each other through a connection interface (not shown).

In addition, connecting the robot controller 10(i) and the device mounted at the tip of the robot 30(i) by wire causes a connection cable to be routed, and therefore, communication by wire becomes substantially difficult. Therefore, as described later, the teaching operation panel 20(i) and the robot 30(i) are wirelessly connected to each other by a wireless device 25(i) connected to the teaching operation panel 20(i) and a wireless device 35(i) mounted on the tip of the robot 30(i).

Furthermore, the robot controllers 10(1)-10(n) may be connected to a network 50 such as LAN (Local Area Network) by wire and connected to each other via the network 50. In this case, the robot controllers 10(1)-10(n) may include a communication unit (not shown) for performing mutual communication by such connection.

It should be noted that the robot controller 10(i) and the robot 30(i) are directly connected to each other via a connection interface (not shown); however, they may be connected to each other via the network 50. In this case, the robot controller 10(i) and the robot 30(i) may include a communication unit (not shown) for performing communication with each other by such connection.

The robot controller 10(i) is a control device (also referred to as "robot controller") that analyzes the program, outputs a control command of the operation to the robot 30(i) to be controlled (a robot that is a control target), and controls the operation of the robot 30.

As will be described later, the robot controller 10(i) acquires the data of the operating state of the robot 30(i) to the control command from the teaching operation panel 20(i) via the wireless communication between the wireless device 25(i) of the teaching operation panel 20(i) and the wireless device 35(i) mounted on the tip of the robot 30(i).

Furthermore, as will be described later, the robot controller 10(i) may receive data of the operating state of the other robot 30(k) from a wireless device 35(k) mounted on the tip of the other robot 30(k) which is not a control target via the wireless device 25(i) of the teaching operation panel 20(i).

It should be noted that k is an integer from 1 to n different from i. In this case, the robot controller 10(i) transfers the data of the operating state of the other robot 30(k) thus received to the other robot controller 10(k) via the network 50. In other words, the robot controller 10(i) acquires the data of the operating state of the robot 30(i) received by the other robot controller 10(k) from the other robot controller 10(k) via the network 50.

As a result, when the other robot controller 10(k) is at a position where the shield can be avoided, the robot controller 10(i) can receive a signal with a good state from the other robot 30(k), even when there is a shield such as a wall or a workpiece between the teaching operation panel 20(i) and the wireless device 35(i) mounted at the tip of the robot 30(i), or when the robot 30(i) itself becomes a shield due to the posture of the robot 30(i).

The teaching operation panel 20(i) is, for example, a device operated by an operator to teach the operation to the robot 30(i) when automatically driving the robot 30(i). The teaching operation panel 20(i) transmits an operation signal to the robot controller 10(i) based on an operation from the operator.

Furthermore, the wireless device 25(i) as a first receiving unit for performing wireless communication with the wireless device 35(i) mounted at the tip of the robot 30 (i) is connected to the teaching operation panel 20(i). The wireless device 25(i) demodulates a signal directly received from the wireless device 35(i) (hereinafter also referred to as a "direct reception signal"), and outputs the demodulated direct reception signal to the robot controller 10(i). The wireless device 25(i) also receives the signal of the data of the operating state from the wireless device 35(k) of the other robot 30(k) as a direct reception signal. Thereafter, the wireless device 25(i) also demodulates the direct reception signal of the data of the other robot 30(k) thus received, and outputs the resulting signal to the robot controller 10(i).

It should be noted that the wireless device 25(i) may be detachably disposed on the teaching operation panel 20(i) like a USB (Universal Serial Bus) device.

The robot 30(i) is a robot that operates based on the control instruction of the robot controller 10(i). The robot 30(i) drives the arm and a movable portion which is an end effector such as a hand, based on the control instruction of the robot controller 10(i). The robot 30(i) can be realized, for example, by a general industrial robot used in a factory that produces automobiles or electronic components.

Furthermore, the wireless device 35(i) for performing wireless communication with the wireless device 25(i) of the teaching operation panel 20(i) is mounted on a movable portion such as an arm or a hand of the robot 30(i). The wireless device 35(i) modulates the signal of the data of the operating state of the robot 30(i) and transmits the signal on the carrier wave. It should be noted that the wireless device 35(i) may be removable.

It should be noted that the signal (packet) transmitted by the wireless device 35(i) includes at least a transmission source address such as a MAC (Media Access Control) address indicating an address of the robot 30(i), a transmission destination address such as a MAC address indicating an address of the robot controller 10(i), and data of an operating state of the robot 30(i).

FIG. 2 is a diagram showing an example of data of an operating state included in a signal. As shown in FIG. 2, the data of the operating state includes, for example, a sequence number indicating the number from the start of transmission of the data (for example, an initial value such as "0") and a transmission flag indicating the completion of transmission by "1". In addition, the data includes the X-axis coordinate (X), the Y-axis coordinate (Y), and the Z-axis coordinate (Z), which are the position data of the robot 30(i). Furthermore, the data includes the rotation angle around the X-axis (W), the rotation angle around the Y-axis (P), and the rotation angle around the Z-axis (R), which are the posture data of the robot 30(i), and a configuration which is other posture data.

It should be noted that the signal transmitted by the wireless device 35(i) may include data such as of acceleration in addition to the data described above.

<Functional Blocks of Robot Controller 10(i)>

Next, the functional blocks included in the robot controller 10(i) will be described.

As shown in FIG. 3, the robot controller 10(i) has a control unit 100. Furthermore, the control unit 100 has a transfer unit 110, a network receiving unit 120, and a signal processing unit 130.

The control unit 100 includes a CPU, ROM, RAM, CMOS memory, and the like, which are configured to be able to communicate with each other via a bus, and are known to those skilled in the art.

The CPU is a processor that generally controls the robot controller 10(i). The CPU reads the system program and the application program stored in the ROM through the bus and controls the entire robot controller 10(i) in accordance with the system program and the application program. Thus, as shown in FIG. 3, the control unit 100 is configured to realize the functions of the transfer unit 110, the network receiving unit 120, and the signal processing unit 130. Various data such as temporary calculation data and display data are stored in the RAM. The CMOS memory is backed up by a battery (not shown), and is configured as nonvolatile memory in which the storage status is maintained even when the power of the robot controller 10(i) is turned off.

If the direct reception signal received by the wireless device 25(i) is a signal from the other robot 30(k) not to be controlled, the transfer unit 110 transfers the signal to the robot controller 10(k) for controlling the other robot 30(k).

More specifically, the transfer unit 110 determines whether or not the transmission destination address of the direct reception signal received by the wireless device 25(i) is the robot controller 10(i), for example. In a case in which the transmission destination address is not the robot controller 10(i), the transfer unit 110 transfers the data of the other robot 30(k) included in the direct reception signal to the other robot controller 10(k) indicated by the transmission destination address via the network 50.

The network receiving unit 120 receives the signal transferred from the other robot controller 10(k) as a second receiving unit.

More specifically, the network receiving unit 120 receives a signal in which the robot controller 10(i) is the transmission destination address (hereinafter, also referred to as "transfer reception signal"), for example, among the signals transferred by the other robot controller 10(k). The network receiving unit 120 outputs the transfer reception signal thus received to the signal processing unit 130.

The signal processing unit 130 processes the direct reception signal received by the wireless device 25(i), and the transfer reception signal received by the network receiving unit 120, respectively.

More specifically, the signal processing unit 130, for example, determines whether or not the data of the operating state of the robot 30(i) in the latest direct reception signal assuming an outlier value exceeding a predetermined allowable variation value in comparison with the data of the operating state of the latest reception signal. For example, if the value of the data of the robot 30(*i*) in the latest direct reception signal is equal to or less than the allowable variation value, the signal processing unit 130 determines that there is no degradation in the direct reception signal due to the shield, and determines to utilize the data of the operating state of the robot 30(*i*) of the direct reception signal.

On the other hand, for example, in a case in which the position data of the robot 30(*i*) of the latest reception signal is 1800 mm, and the position data of the latest direct reception signal is 1000 mm, the variation amount of the position data is 800 mm. For example, if the allowable variation value is set to 200 mm, since this variation amount 800 mm exceeds the allowable variation value, the signal processing unit 130 determines that the position data of the robot 30(*i*) in the latest direct reception signal assumes an outlier value. Thereafter, the signal processing unit 130 determines that the direct reception signal is deteriorated by the shield, and determines to utilize the transfer received signal.

In this case, the signal processing unit 130 determines whether the data of the operating state of the robot 30(*i*) in the latest transfer reception signal assumes the outlier value exceeding the allowable variation value in comparison with the data of the operating state of the latest reception signal. In a case in which the data of the operating state of the robot 30(*i*) in the latest transfer reception signal is equal to or less than the allowable variation value and does not assume the outlier value, the signal processing unit 130 determines to utilize the data of the robot 30(*i*) of the latest transfer reception signal. On the other hand, in a case in which the data of the operating state of the robot 30(*i*) in the latest transfer reception signal assumes the outlier value exceeding the allowable variation value, the signal processing unit 130 determines not to utilize the data of the transfer reception signal.

It should be noted that, when the signal processing unit 130 receives the transfer reception signal from a plurality of other robot controllers 10(*k*), the signal processing unit 130 may perform averaging processing on the data of the operating state of the robot 30(*i*) of the transfer reception signal received from the plurality of other robot controllers 10(*k*). The signal processing unit 130 may determine whether the data of the operating state of the averaged transfer reception signal assumes an outlier value exceeding the allowable variation value in comparison with the data of the operating state of the latest reception signal.

<Signal Processing of Robot Controller 10(*i*)>

Next, the operations relating to signal processing of the robot controller 10(*i*) according to the present embodiment will be described.

Figure 4:
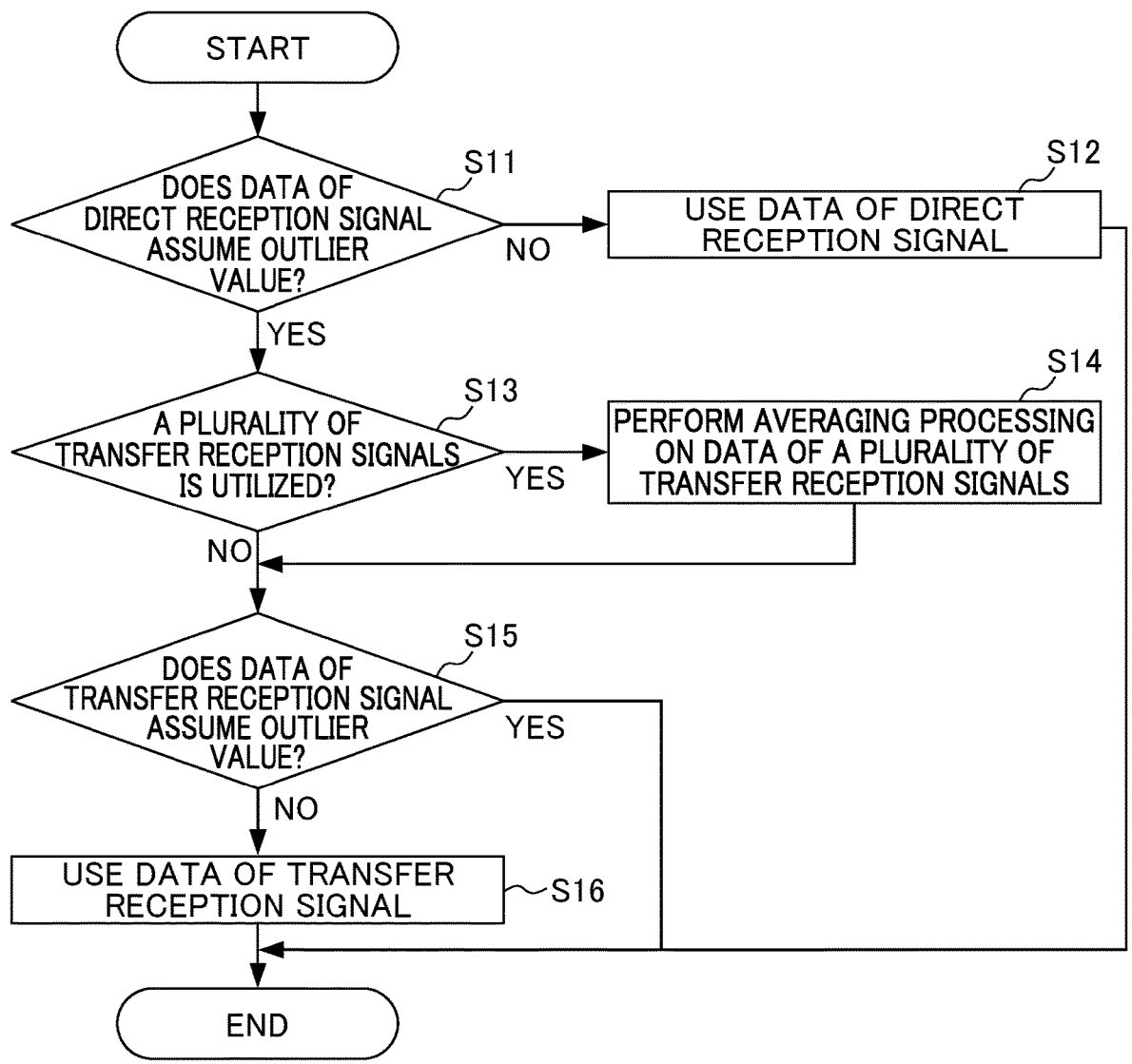
FIG. 4 is a flowchart illustrating signal processing of the robot controller.

FIG. 4 is a flowchart for explaining the signal processing of the robot controller 10(*i*). The flow shown here is executed repeatedly each time a direct reception signal is received.

In Step S11, the signal processing unit 130 determines whether or not the data of the operating state of the robot 30(*i*) in the latest direct reception signal assumes an outlier value exceeding the allowable variation value in comparison with the data of the operating state of the latest reception signal. When the data of the latest direct reception signal assumes the outlier value, the processing proceeds to Step S13. On the other hand, in a case in which the data of the latest direct reception signal is equal to or less than the allowable variation value, and does not assume an outlier value, the processing proceeds to Step S12.

In Step S12, the signal processing unit 130 uses the data of the operating state of the robot 30(*i*) of the direct reception signal, the processing ends.

In Step S13, the signal processing unit 130 determines whether to utilize a plurality of transfer reception signals received from the plurality of other robot controllers 10(*k*) via the network receiving unit 120. When the plurality of transfer reception signals is used, the processing proceeds to Step S14. On the other hand, when the plurality of transfer reception signals is not used, the processing proceeds to Step S15.

In Step S14, the signal processing unit 130 performs averaging processing on the data of the operating state of the robot 30(*i*) in the plurality of transfer reception signals received from the plurality of other robot controllers 10(*k*).

In Step S15, the signal processing unit 130 determines whether the data of the operating state of the robot 30(*i*) in one latest transfer reception signal or in the transfer reception signal averaged in Step S14 assumes an outlier value exceeding the allowable variation value in comparison with the data of the operating state of the latest reception signal. When the data of the robot 30(*i*) in the transfer reception signal does not assume the outlier value, the processing proceeds to Step S16. On the other hand, if the data of the robot 30(*i*) in the transfer reception signal assumes the outlier value, the signal processing unit 130 determines not to utilize the data of the transfer reception signal, and the processing ends.

In Step S16, the signal processing unit 130 uses the data of the operating state of the robot 30(*i*) of the one latest transfer reception signal or the transfer reception signal averaged in Step S14.

As described above, via the wireless device 25 of the teaching operation panel 20, the robot controller 10 according to an embodiment receives the data of the operating state of the robot 30 to be controlled, and receives the data of the operating state of the other robot 30 not to be controlled. The robot controller 10 transfers the data of the operating state of the other robot 30 thus received to the other robot controller 10 for controlling the other robot 30 via the network 50. Furthermore, the robot controller 10 receives the data of the operating state of the robot 30 to be controlled which are transferred by the other robot controller 10 via the network 50. That is, the robot controller 10 directly receives the data of the operating state of the robot 30 from the wireless device 35 mounted on the robot 30 to be controlled, and receives the data of the operating state of the robot 30 transferred by the other robot controller 10 via the network 50.

Thus, it is possible for the robot controller 10 to reliably receive the data from the robot 30 even when there is a shield between the teaching operation panel 20 and the robot 30, or even when the robot 30 itself becomes a shield of the wireless device 35 due to the posture of the robot 30.

Although one embodiment has been described above, the robot controller 10 is not limited to the above-described embodiment, and includes modifications, improvements, and the like within a range that can achieve the object thereof.

Modification Example 1

In the above-described embodiment above, the wireless device 25 is connected to the teaching operation panel 20;

however, the present invention is not limited thereto, and the wireless device 25 may be included in the robot controller 10.

Modification Example 2

For example, in the above-described embodiment, the signal processing unit 130 determines whether or not the data of the operating state of the robot 30 in the latest direct reception signal or the transfer reception signal assumes an outlier value exceeding a predetermined allowable variation value in comparison with the data of the operating state of the latest reception signal; however, the present invention is not limited thereto. For example, the signal processing unit 130 may determine whether the sequence number indicated by the latest direct reception signal or the transfer reception signal is a value that is continuous with the sequence number of the latest reception signal. Thus, it is possible for the signal processing unit 130 to determine the presence or absence of deterioration in the signal due to the shield, and it is possible to detect whether the data of the operating state of the robot 30 of which sequence number is missing.

Modification Example 3

Furthermore, for example, in the above-described embodiment above, the robot controller 10 receives the transfer reception signal from all of the other robot controllers 10; however, the present invention is not limited thereto. For example, the robot controllers 10(1)-10(n) may be divided into two or more groups. The robot controller 10 may receive the transfer receive signal only from other robot controllers 10 of the same group.

With such a configuration, it is possible to reduce the processing of the robot controller 10. It should be noted that the grouping may be determined in accordance with a range of a predetermined distance, work content performed by the robot 30, and the like.

Each function included in the robot controller 10 in an embodiment can be realized by hardware, software, or a combination thereof. Here, being realized by software means being realized by a computer reading and executing a program.

Each component included in the robot controller 10 can be realized by hardware including an electronic circuit, software, or a combination thereof. In the case of being realized by software, a program constituting the software is installed in a computer, i.e., the robot controller 10. These programs may also be recorded on removable media and distributed to the user or downloaded to the user's computer over a network. Furthermore, when configured by hardware, a part or all of the functions of each component included in the above-described device can be constituted by an integrated circuit (IC) such as, for example, an ASIC (Application Specific Integrated Circuit), a gate array, an FPGA (Field Programmable Gate Array), a CPLD (Complex Programmable Logic Device), or the like.

The programs can be stored on any of various types of non-transitory computer readable media and be provided to a computer. The non-transitory computer readable media include various types of tangible storage media. Examples of non-transient computer-readable media include magnetic recording media (e.g., flexible disks, magnetic tapes, hard disk drives), magnetic-optical recording media (e.g., magnetic-optical disks), CD-ROM (Read Only Memory), CD-R, CD-R/W, and solid-state memories (e.g., mask ROMs, PROM, EPROM, flash ROMs, RAMs). The programs may be provided to a computer using any of various types of transitory computer readable media. Examples of the transitory computer readable media include electrical signals, optical signals, and electromagnetic waves. A transitory computer readable medium can provide programs to a computer through a wired communication path such as an electrical cable, an optical fiber, or the like, or a wireless communication path.

It should be noted that the steps writing a program to be recorded on a recording medium include processing that is performed in a time series manner according to the order and processing that is performed in a parallel or independent manner even if the processing is not necessarily performed in a time series manner.

In other words, the robot controller of the present disclosure can assume various embodiments having the following configurations.

(1) The robot controller 10 of the present disclosure is a robot controller that receives a signal transmitted by a wireless device 35 mounted to a robot 30 that is a control target, the signal including data of an operating state of the robot 30, the robot controller 10 including: a wireless device 25 that receives the signal including the data from the wireless device 35; a transfer unit 110 that, in a case in which the signal received by the wireless device 25 is a signal from other robot 30 not to be controlled, transfers the signal to other robot controller 10 controlling the other robot 30; a network receiving unit 120 that receives the signal transferred from the other robot controller 10; and a signal processing unit 130 that processes the signal received by the wireless device 25 and/or the signal received by the network receiving unit 120.

According to the robot controller 10, it is possible to reliably receive the data from the robot 30 even when there is a shield.

(2) The robot controller 10 according to (1) further may include a teaching operation panel 20, and the wireless device 25 may be detachably connected to the teaching operation panel 20.

With such a configuration, the wireless device 25 can be located at any position.

(3) In the robot controller 10 according to (1) or (2), the transfer unit 110 may transfer the signal including the data of the operating state of the other robot 30 received by the wireless device 25 to the other robot controller 10 controlling the other robot 30 via a wire.

With such a configuration, if the other robot controller 10 is in a position that can avoid the shield, a signal having a good state can be received.

(4) In the robot controller 10 according to any one of (1) to (3), the signal processing unit 130 may determine to use one of the signal received by the wireless 25 or the signal received by the network receiving unit 120, based on at least a state of the data of the robot 30 that is the control target in the signal received by the wireless device 25.

With such a configuration, it is possible to reliably receive the data from the robot 30 by selecting a signal having a good state.

(5) In the robot controller 10 according to any one of (1) to (4), the signal processing unit 130 may perform, in a case in which signals are received from a plurality of other robot controllers 10 by the network receiving unit 120, averaging processing on the signals received from the plurality of other robot controllers 10.

With such a configuration, it is possible to reduce deterioration in signals received in each of the other robot controllers 10.

EXPLANATION OF REFERENCE NUMERALS 1 robot system
10(1)-10(n) robot controller
110 transfer unit
120 network receiving unit
130 signal processing unit
20(1)-20(n) teaching operation panel
25(1)-25(n) wireless device
30(1)-30(n) robot
35(1)-35(n) wireless device

What is claimed is:

1. A robot controller that receives a signal transmitted by a wireless device mounted to a robot that is a control target, the signal including data of an operating state of the robot, the robot controller comprising:
a first receiving unit that receives the signal including the data from the wireless device mounted to the robot;
a transfer unit that, in a case in which the signal received by the first receiving unit is a signal from other robot not to be controlled, transfers the signal to other robot controller controlling the other robot;
a second receiving unit that receives the signal transferred from the other robot controller; and
a signal processing unit that determines whether or not the signal received by the first receiving unit has an outlier value exceeding a predetermined allowable variation value, and upon determining that the signal received by the first receiving unit has the outlier value, determines whether or not the signal received by the second receiving unit has the outlier value, wherein the robot controller controls the robot using one or more of the signal received by the first receiving unit not exceeding the predetermined allowable variation value and the signal received by the second receiving unit not exceeding the predetermined allowable variation value.

2. The robot controller according to claim 1, further comprising a teaching operation panel,
wherein the first receiving unit is detachably connected to the teaching operation panel.

3. The robot controller according to claim 1, wherein the transfer unit transfers the signal including the data of the operating state of the other robot received by the first receiving unit to the other robot controller controlling the other robot via a wire.

4. The robot controller according to claim 1, wherein the signal processing unit performs, in a case in which signals are received from a plurality of other robot controllers by the second receiving unit, averaging processing on the signals received from the plurality of other robot controllers.

* * * * *